United States Patent
Aiso et al.

(10) Patent No.: US 7,286,073 B2
(45) Date of Patent: Oct. 23, 2007

(54) DEVICE FOR DETECTING OPERATION OF OPERATOR ON SOUND CONTROL APPARATUS

(75) Inventors: Masaru Aiso, Hamamatsu (JP); Akio Suyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 11/391,857

(22) Filed: Mar. 28, 2006

(65) Prior Publication Data

US 2006/0220929 A1    Oct. 5, 2006

(30) Foreign Application Priority Data

Mar. 29, 2005   (JP)   ............................. 2005-095650

(51) Int. Cl.
  *H03M 1/12*      (2006.01)
(52) U.S. Cl. ....................................... 341/156; 341/155
(58) Field of Classification Search ................ 341/155, 341/156, 131; 345/184
  See application file for complete search history.

(56) References Cited

U.S. PATENT DOCUMENTS

| | | | | |
|---|---|---|---|---|
| 5,912,663 | A * | 6/1999 | Cheng | ........................ 345/184 |
| 6,154,201 | A * | 11/2000 | Levin et al. | ................. 345/184 |
| 6,559,773 | B1 * | 5/2003 | Berry | ........................ 340/815.4 |
| 6,805,020 | B2 * | 10/2004 | Onodera | ................. 74/471 XY |
| 6,993,990 | B2 * | 2/2006 | Kojima et al. | ............. 74/10.27 |
| 7,038,667 | B1 * | 5/2006 | Vassallo et al. | ............. 345/184 |

OTHER PUBLICATIONS

CS1D Control Surface Operating Manual, Yamaha Corporation, Japan, pp. 9 and 19, no date given.

* cited by examiner

*Primary Examiner*—Brian Young
(74) *Attorney, Agent, or Firm*—Morrison & Foerster LLP

(57) ABSTRACT

Knob-type operator provided on an operation section is provided with a switch mechanism that switches between ON and OFF states in response to depressing operation of the operator along the rotation axis of the operator. Operator operation detection circuit outputs, to a CPU, a rotated amount and direction corresponding to rotating operation of the operator. The rotated amount corresponding to rotating operation of the operator is converted into a variation amount of a setting of a parameter to be controlled. Resolution with which to associate the rotated amount with the variation amount can be set to any one of two types of resolution, coarse resolution and fine resolution. The rotated amount is converted into the variation amount in accordance with the currently-set type of resolution, and the parameter setting is changed on the basis of the variation amount.

13 Claims, 2 Drawing Sheets

DEVICE FOR DETECTING OPERATION OF OPERATOR ON SOUND CONTROL APPARATUS

BACKGROUND OF THE INVENTION

The present invention relates generally to sound control apparatus, such as audio mixers, and more particularly to an improvement in operability of an operator provided on a sound control apparatus.

Digital audio mixers have been known which convert an analog audio signal, input for each of a plurality of input channels, to a digital signal and then perform digital processing on the converted digital signals of the channels. Users of these digital audio mixers can each manually perform various operation related to mixing processing, using various operators provided on an operation panel (or mixing console). Digital signal processing device (DSP) in the digital audio mixer performs mixing processing on input digital audio signals on the basis of various operation performed by the user. The operators provided on the operation panel include rotationally-operable "knob-type (i.e., rotary-type) operators", which are operators each operable to change a setting of a parameter represented in a continuous value, such as a panning level, output level, send level or gain. As a human operator operates any one of the knob-type operators, an operated amount corresponding to the rotating operation is detected, and the thus-detected operated amount is converted into a variation amount of the parameter setting corresponding to (or controllable by) the knob-type operator. Namely, the human operator can set a desired value of the parameter corresponding to (controllable by) the knob-type operator. Among examples of digital mixers provided with such knob-type operators is a digital audio mixer commercially available from the assignee of the instant application under a product name "PM5D". The digital audio mixer "PM5D" is introduced in a website "http//www2.yamaha.co.jp/manual/pdf/pa/japan/mixers/PM5DJ1.pdf" or "http//www2.yamaha.co.jp/manualpdf/pa/English/mixers/CS1DE.pdf" (hereinafter referred to as "non-patent literature").

When an operated amount corresponding to a rotating operation of any one of the knob-type operators is to be converted into a variation amount of the corresponding parameter in the mixer apparatus disclosed in the above-identified non-patent literature, any desired one of two different types of resolution, i.e. coarse resolution and fine resolution, can be used as resolution of the variation amount corresponding to the operated amount. With the coarse resolution, a great parameter variation amount is provided per operated amount, so that the parameter value can be varied (set) intuitively in accordance with a rotating angle of the knob-type operator. With the fine resolution, on the other hand, a small parameter variation amount is provided per operated amount, so that the parameter value can be varied finely.

More specifically, the mixer apparatus disclosed in the above-identified non-patent literature is constructed in such a manner that switching can be made between the above-mentioned two types of resolution in accordance with an operating speed (rotating speed) of the knob-type operator. Namely, a speed at which the human operator has operated any one of the knob-type operators (i.e., operating speed of the knob-type operator) is calculated, and if the calculated operating speed is higher than a predetermined value (i.e., the operating speed is relatively high), the coarse resolution is used, while, if the calculated operating speed is lower than a predetermined value (i.e., the operating speed is relatively low), the fine resolution is used.

In operation of mixers, it is common for the human operator to change various parameter values in real time by manipulating a multiplicity of operators while causing sound signals of a plurality of channels to be subjected to mixing. Therefore, there is a likelihood that an error in instructing a change of a given parameter value will have great adverse influences on the entire mixing. Thus, it is preferable that operation for changing a parameter value be performed reliably and promptly.

However, with the aforementioned conventionally-known construction that switching is made between two types of resolution in accordance with an operating speed of a knob-type operator, the switching between the two types of resolution depends on the intensity of force applied to the knob-type operator by the human operator, the parameter changing operation tends to become unreliable, which would lead to an increased possibility of an operating error. For example, if the human operator has operated the knob-type operator quickly, due to some misadjustment of his or her operating force, although the human operator thought he or she operated the knob-type operator slowly enough, the operated amount would be processed with the coarse resolution against his or her will so that the parameter variation amount undesirably becomes greater than initially intended. Further, in many cases, the human operator frequently changes various parameter values during mixing operation. However, with the aforementioned construction, the human operator has to be conscious of an operating speed and pay excessive attention to the operation whenever a parameter value is to be changed, in order to prevent an operating error. Namely, the conventionally-known construction of switching between the different types of resolution in accordance with the operating speed of the knob-type operator would present the problem of poor operability.

SUMMARY OF THE INVENTION

In view of the foregoing, it is an object of the present invention to achieve an enhanced operability of an operator for which resolution of a parameter setting variation amount relative to an operated amount of the operator is switchable between different types (or degrees) of resolution, in a sound control apparatus, such as an audio mixer.

In order to accomplish the above-mentioned object, the present invention provides an improved device for detecting operation of an operator on a sound control apparatus, which comprises the device comprising: an operator operable in two operational directions; a detection section for detecting an operated amount corresponding to operation of the operator in a first one of the two operational directions; a resolution setting section that, on the basis of operation of the operator in a second one of the two operational directions, sets resolution of the operated amount, in the first operational direction, of the operator to any one of at least two types of resolution; and a conversion section that converts the operated amount, detected by the detection section, into operator output information based on the resolution set by the resolution setting section.

According to the present invention, the operator is operable in two different operational directions. Operator output information (e.g., parameter setting information) is output on the basis of an operated amount corresponding to operation in a first one of the two operational directions, and resolution of the operated amount corresponding to the operation in the first operational direction is set to any one of at least two different types of resolution on the basis of operation in a second one of the two operational directions. As an example, the operator is operable in a rotating operation direction about a rotation axis thereof and in a depressing operation direction along the rotation axis. The detection section detects an operated amount corresponding to the rotating operation of the operator, and the resolution setting section sets the resolution to any one of the at least two types of resolution depending on whether the operator has been operated in the depressing operation direction. Because the operator is operable in two operational directions (e.g., in the rotating operation direction and in the depressing operation direction), operation in the direction different in dimension from the parameter-setting operation direction, can instruct appropriate switching between the two different types of resolution, so that any operational error related to the use of the two types of resolution can be effectively prevented. Further, operating input (parameter setting) can be performed as intended by the human operator. Further, because the present invention allows two different types of instructions (i.e., operating input or parameter setting and resolution switching) to be done by appropriately using the two operational directions of the same operator, it can achieve the superior benefit that the resolution switching and parameter-setting changing operation by the human operator can be performed reliably and promptly, which can thereby achieve an significantly-enhanced operability.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE INVENTION

Figure 1:
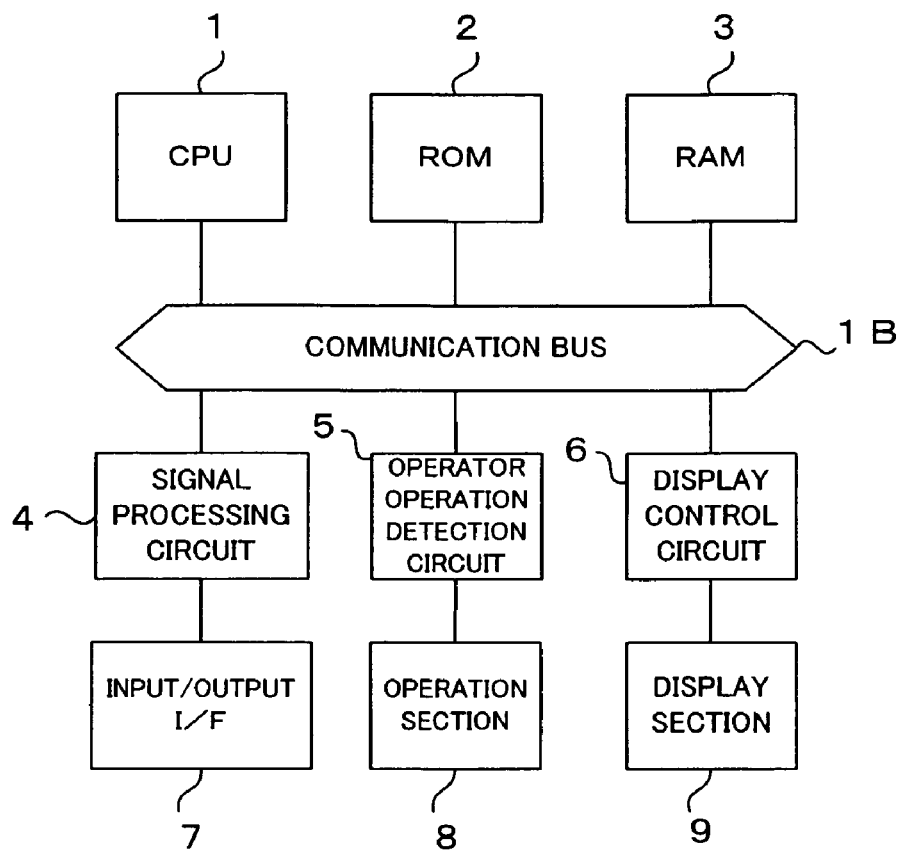
FIG. 1 is a block diagram showing a general electric hardware setup of an audio mixer in accordance with an embodiment of the present invention.

FIG. 1 is a block diagram showing a general electric hardware setup of an audio mixer in accordance with an embodiment of the present invention. The mixer includes a CPU 1, a ROM 2, a RAM 3, a signal processing circuit (DSP) 4, an operator operation detection circuit 5 and a display control circuit 6, and these components are connected with one another via a communication bus 1B. To the signal processing circuit (DSP) 4 is connected an input/output interface (I/F) 7. The input/output I/F 7, which includes an A/D converter and D/A converter, converts analog audio signals of a plurality of predetermined channels into digital audio signals and supplies the converted audio signals to the DSP 4. The input/output I/F 7 also converts digital audio signals, processed by the DSP 4, into analog audio signals and outputs the converted analog audio signals to outside the audio mixer. Operation section (operator group) 8 is connected to the communication bus 1B via the operator operation detection circuit 5, and a display section 9 is connected to the communication bus 1B via the display section 9. The operation section 8 comprises a plurality of operators provided on an operation panel (mixing console) of the audio mixer, which include knob-type operators (see FIG. 2), fader operators and various switches. Contents of operation on the operation section 8 and settings of the various operators are detected by the operator operation detection circuit 5, and the detection results are output to the CPU 1. The display section 9, which comprise for example an LCD, is provided on the operation panel. Windows corresponding to various functions of the mixer are displayed on the display section 9. Human operator can use the display section 9 as a user interface for, for example, making settings for the entire mixer and settings of parameters for various functions of the mixer. The human operator can perform mixing operation, including tone volume control on audio signals and setting of various effects, setting of various parameters, etc., using the operation section 8 and GUI of the display section 9.

The CPU 1 executes various control programs stored in the ROM 2 and/or RAM 3 to control operation of the entire mixer and gives instructions, based on contents of various operation on the operation section and display section 9, to the signal processing circuit (DSP) 4. The DSP 4 performs signal processing, based on the instructions given from the CPU 1, on each digital audio signal input via the input/output I/F 7 and outputs the processed result as a mixing output via the input/output I/F 7. The various programs for execution by the CPU 1 are not limited to those stored in the ROM 2 and/or RAM 3, and they may be ones downloaded from a server computer via a not-shown communication interface and then stored in a not-shown hard disk device (HDD) or the like, or ones stored in advance in the not-shown hard disk device or in a removable storage medium, such as a CD-ROM. In such a case, any desired one of the various programs is transferred to the RAM 3 when it is to be executed and then executed under control of the CPU 1; such arrangements facilitate addition and version upgrade of any desired program.

Figure 2:
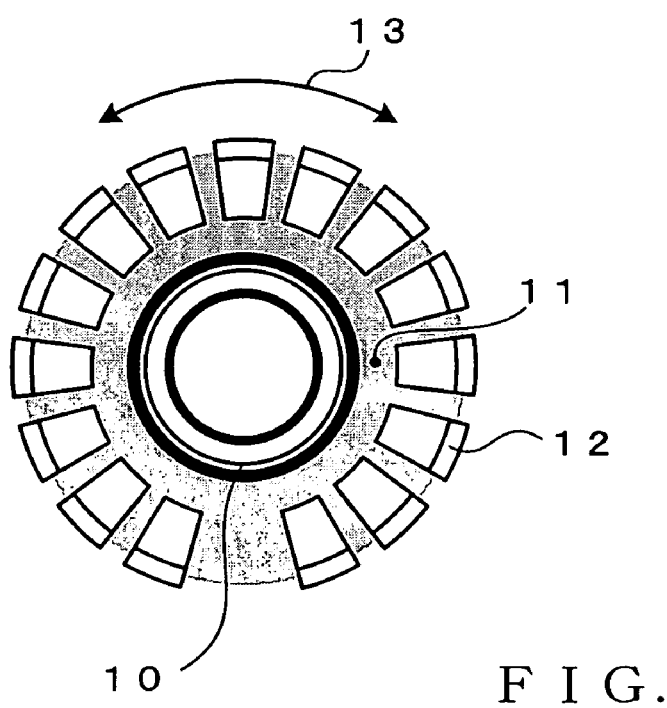
FIG. 2 is a plan view of a knob-type operator provided on the digital mixer.

FIG. 2 is a diagram explanatory of an example construction of one of the knob-type operators included in the operation section 8; more specifically, FIG. 2 is a plan view of one of the knob-type operators 10 provided on the operation panel 11. In the figure, the knob-type operator 10 includes a cylindrical member (or knob portion) projecting from the surface of the operation panel 11 and rotatable about the axis of the body (i.e., knob portion) of the knob-type operators 10. A plurality of LEDs 12 (in the figure, reference numeral 12 is attached to only one of the LEDs for simplicity of illustration) are disposed around the knob-type operators 10.

In FIG. 2, the knob-type operator 10 is rotatable in opposite directions (clockwise and counterclockwise directions) as indicated by a two-head arrow 13. Let's assume that no mechanical stop end is set for the rotation of the knob-type operator 10; namely, the human operator can continue rotating the knob-type operator 10 as much as desired in the opposite (clockwise and counterclockwise) directions. As the knob-type operator 10 is rotated by the human operator, the operator operation detection circuit 5 (FIG. 1) detects an amount and direction of the rotation (i.e., rotated amount and direction) of the operator 10 based on the rotating operation and outputs the detected information (rotated amount and direction) to the CPU 1 (FIG. 1). In accordance with the detected rotated amount and direction of the operator 10 output from the operator operation detection circuit 5, the CPU 1 generates a variation amount of the setting of the parameter controllable by the operator 10 and performs control to change the setting of the parameter in the signal processing circuit 4 on the basis of the generated variation amount. The current setting of the parameter is stored in a register, and the registration value is increased or decreased on the basis of the change control by the CPU 1, so that the parameter setting is changed. Note that the rotated direction of the knob-type operator 10 corresponds to the increasing or decreasing direction of the parameter setting. It is assumed, for example, that the parameter value is increased in response to the clockwise rotation of the operator 10 while the parameter value is decreased in response to the counterclockwise rotation of the operator 10.

As resolution of the variation amount of the parameter setting corresponding to the rotated amount of the knob-type operator 10, two different types of resolution, i.e. fine resolution (i.e., resolution #1) and coarse resolution (i.e., resolution #2), can be switchably used. Unit increase/decrease value of the variation amount of the parameter setting, corresponding to the rotated amount and direction of the knob-type operator 10, differs depending on which of the fine and coarse resolution is selected.

The knob-type operator 10 is pushable or depressable relative to the operation panel 11 in a vertical direction (i.e., in an axial direction, or rotational axis direction, of the body of the operator 10). Such depression of the operator 10, i.e. operation along the axial direction of the operator 10, permits appropriate switching between the two different types of resolution of the parameter setting variation amount. With the arrangement that the knob-type operator 10 is operable in the two different operational directions, i.e. rotating and depressing operation directions, the two types of resolution can be switchably used through operation in the depressing operation direction (i.e., axial direction) that is different in dimension from the parameter-setting rotating operation direction. In this way, any operational error related to the use of the two types of resolution can be effectively prevented.

In the instant embodiment, the axial depressing operation of the knob-type operator 10 is permitted via a push-type (i.e., depressing-type) ON/OFF switch mechanism provided on or in the operator 10. The ON/OFF switch mechanism comprises a toggle switch that alternately switches between two positions or states, i.e. ON and OFF states, in response to depressing operation of the body (knob portion) of the knob-type operator 10. Such switching between the ON and OFF states of the ON/OFF switch mechanism can switch between the two types of resolution (i.e., resolution #1 and resolution #2). Let it be assumed here that the OFF state of the switch mechanism corresponds to the coarse resolution (resolution #2) and the ON state of the switch mechanism corresponds to the fine resolution (resolution #1). In the instant embodiment, the switch mechanism is normally kept in the OFF state; namely, the resolution of the variation amount of the parameter setting is normally set at the coarse resolution #2. More specifically, when the fine resolution #1 is to be used, the human operator can depress the knob-type operator 10 to switch the switch mechanism from the OFF state to the ON state so as to switch the resolution setting to the fine resolution #1. Then, as the human operator again depresses the knob-type operator 10, the switch mechanism can be switched back to the OFF state, so that the resolution setting is switched back to the coarse resolution #2.

In the case of the coarse resolution #2, the variation amount of the parameter setting relative to the rotated amount of the knob-type operator 10 is set by associating a rotational range of substantial one rotation of the knob-type operator 10 with a settable value range (i.e., range from a minimum vale to a maximum value) of the parameter. Thus, with the coarse resolution #2, the parameter value is increased by a plurality of predetermined unit values (each greater than one) per operation through a predetermined unit rotating angle, so that the human operator can intuitively perform parameter setting operation on the basis of the rotating angle of the knob-type operator 10.

In the case of the fine resolution #1, on the other hand, the parameter value is increased by one predetermined unit value per operation through a predetermined unit rotating angle, so that the parameter setting can be varied finely.

Illumination of the LEDs 12 disposed around the knob-type operator 10 is controlled in accordance with a current value (i.e., current setting) of the parameter corresponding to the operator 10, so that the human operator can visually identify an approximate value of the parameter. Namely, the arranged range of the LEDs 12 is associated with the settable value range (i.e., range from the minimum vale to the maximum value) of the parameter, so that, as the parameter is increased in value, an illuminated range of the group of the LEDs 12 is increased (namely, the number of the illuminated LEDs 12 is increased). Thus, in the illustrated example of FIG. 2, up to 15 values of the parameter can be indicated by the illumination of the LEDs 12; that is, the parameter setting can be indicated in 15 steps by the LEDs 12.

For example, the knob-type operator 10 may be constructed in such a manner that one click feel is imparted, in correspondence with one LED 12, per rotation through the unit rotating angle and an instruction for changing the parameter setting is given per click (i.e., per rotating operation of the operator 10 through the unit rotating angle that corresponds to a distance between two adjacent LEDs 12). The fine resolution #1 and coarse resolution #2 in such arrangements is explained below.

In the case of the coarse resolution #2, the arranged range of the LEDs 12 corresponds not only to the rotational range of substantial one rotation of the knob-type operator 10, but also to the entire settable value range (i.e., range from the minimum vale to the maximum value) of the parameter. Namely, in this case, the knob-type operator 10 functions as an absolute-type operator where an operated amount is handled as an absolute value. Thus, the coarse resolution #2 is set in corresponding relation to the total number of the LEDs 12. In the illustrated example of FIG. 2, where a total of 15 LEDs 12 are provided, the use of the coarse resolution #2 allows the parameter to be set with a resolution of 15 steps. Further, because the illuminated range of the group of the LEDs 12 varies in correspondence with the rotating angle of the operator 10, the human operator can intuitively set a value of the parameter on the basis of the rotating angle of the operator 10 and visually identify the setting through the illumination of the LEDs 12.

In the case of the fine resolution #1, the number of the clicks equals an increased or decreased value in the setting of the parameter. Namely, in this case, the knob-type operator 10 functions as an incremental-type operator where an operated amount is handled as an increment value. Further, in this case, the rotating angle of the knob-type operator 10 does not correspond to the parameter setting indicated by the illumination of the LEDs 12, and thus, the rotating angle of the knob-type operator 10 does not correspond to the illumination of the LEDs 12 in a one-to-one relationship.

Figure 3:
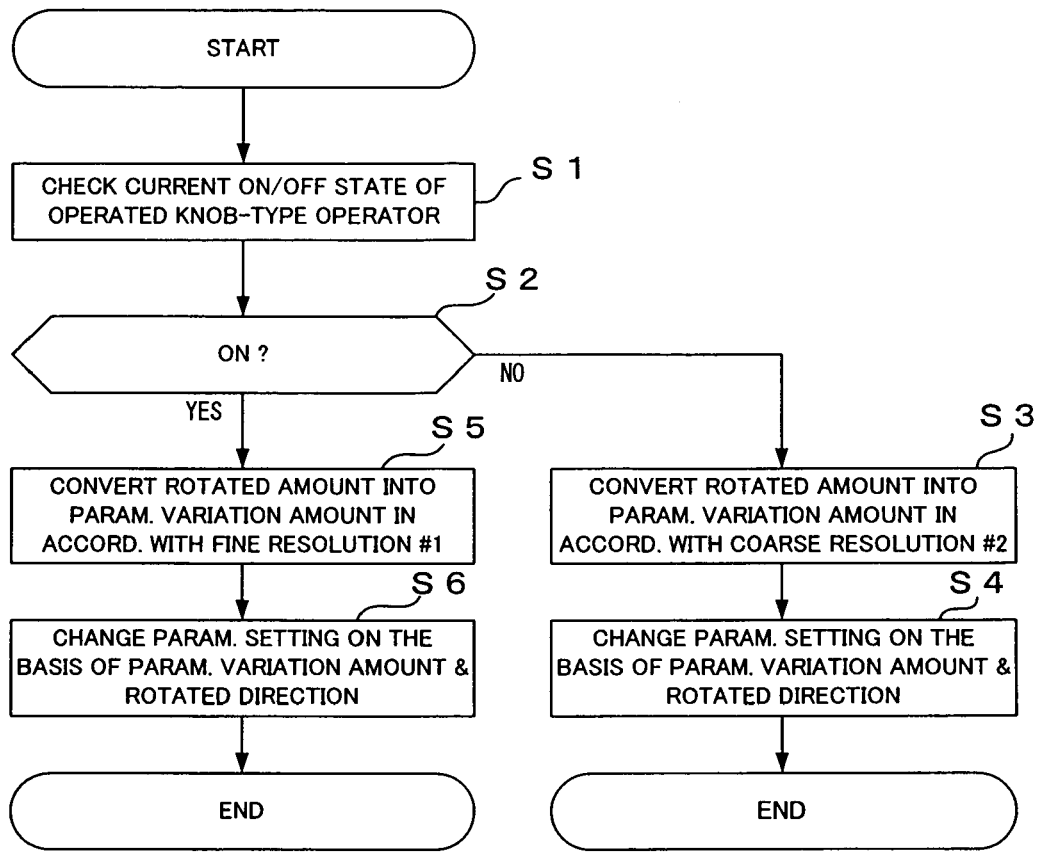
FIG. 3 is a flow chart showing an example operational sequence of processing performed in the embodiment for detecting rotating operation of the knob-type operator.

FIG. 3 is a flow chart showing an example operational sequence of parameter-setting change processing responsive to operation of the knob-type operator 10 (i.e., processing for detecting rotating operation of the knob-type operator 10). The operator operation detection circuit 5 constantly detects, at a predetermined frequency, operational states of the operation section 8 including the knob-type operators 10. Upon detection of rotating operation of any one of the knob-type operators 10, information indicative of a rotated amount and direction of the rotating operation is generated, and the CPU 1 performs the processing of FIG. 3 on the basis of the generated information.

At step S1, the CPU 1 checks the current push-ON/OFF state of the rotated knob-type operators 10. Switching is made between the ON and OFF states of the knob-type operators 10 in response to depressing operation of the operator 10 along its rotation axis direction. The knob-type operators 10 is normally kept in the OFF state as noted above (i.e., a NO determination is normally made at step S2). If the rotated knob-type operators 10 is currently in the OFF state as determined at step S2, the rotated amount is converted into a parameter variation amount in accordance with the coarse resolution #2. At following step S4, the parameter setting in the signal processing circuit 4 is changed for the parameter corresponding to the operated knob-type operator 10, on the basis of the variation amount and rotated direction of the operators 10. In the case where the illumination state of the group of the LEDs 12 disposed around the knob-type operator 10 corresponds to the setting with the coarse resolution as illustrated in FIG. 2, the illumination state is updated in accordance with the new setting of the parameter. If, on the other hand, the rotated knob-type operators 10 is currently in the ON state (YES determination at step S2), the rotated amount is converted into a parameter variation amount in accordance with the fine resolution #1, at step S5. At following step S6, the parameter setting in the signal processing circuit 4 is changed for the parameter corresponding to the operated knob-type operator 10, on the basis of the variation amount and rotated direction of the operators 10.

Figure 4:
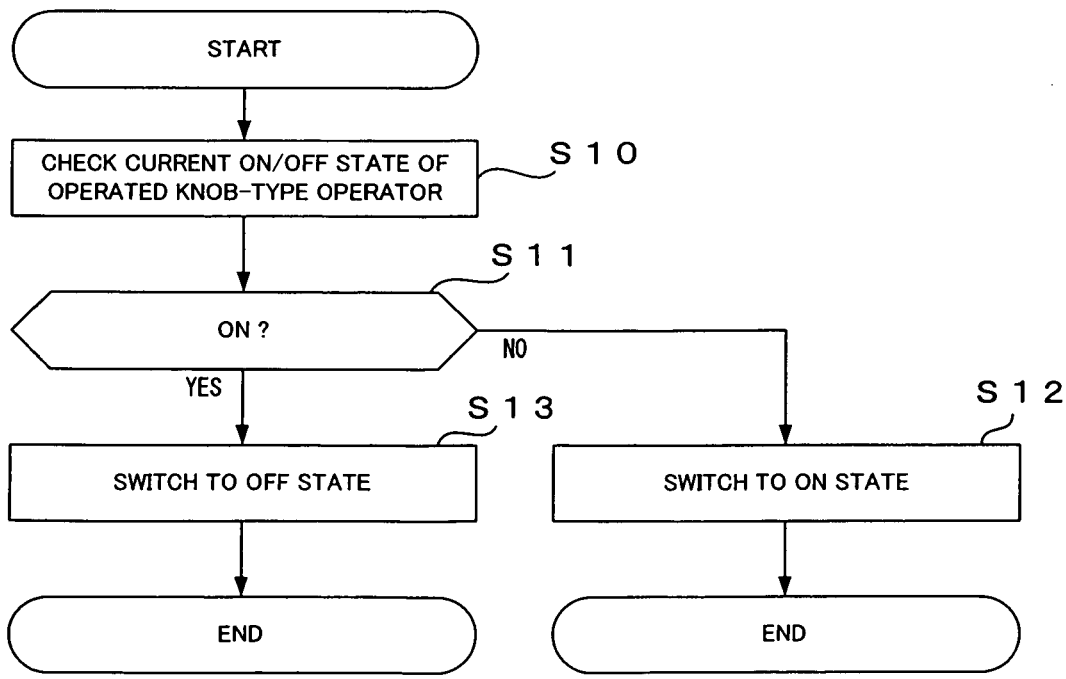
FIG. 4 is a flow chart showing an example operational sequence of processing for detecting depressing operation of the knob-type operator.

FIG. 4 is a flow chart showing an example operational sequence of processing for detecting depressing operation of the push-type ON/OFF switch mechanism of the knob-type operator 10. Once depressing operation of the operator 10 along its rotation axis direction is detected by the operator operation detection circuit 5, the CPU 1 carries out operations of steps S10-S13 shown in FIG. 4. Namely, the CPU 1 first checks the current ON/OFF state of the switch mechanism of the depressed knob-type operators 10, at step S10. If the switch mechanism is currently in the OFF state (NO determination at step S11), the switch mechanism of the depressed knob-type operators 10 is switched to the ON state at step S12. As noted above, the switch mechanism is normally kept in the OFF state. If the switch mechanism is currently in the ON state (YES determination at step S11), the switch mechanism of the depressed knob-type operators 10 is switched to the OFF state at step S13. By the switch mechanism being switched between the ON and OFF states through the aforementioned operation, there can be achieved toggle action for alternately switching between the two types of resolution (fine resolution #1 and coarse resolution #2).

In the embodiment of the digital mixer, as described above, the knob-type operator 10 is operable in two operational directions, i.e. rotating operation direction about the axis of the operator 10 and depressing operation direction along the axis of the operator 10, and the rotating operation is performed for setting a value of the corresponding parameter while the depressing operation is performed for switching between the two different types of resolution. Thus, the operation for switching between the different types of resolution can be performed accurately as intended by the human operator without involving any particular operational error. Further, because the embodiment allows two different types of instructions (i.e., instructions for parameter setting and resolution switching) to be done by appropriately using the two operational directions of the same operator, it can achieve the superior benefit that the resolution switching and parameter-setting changing operation by the human operator can be performed reliably and promptly.

Whereas the preceding paragraphs have described the switch mechanism as being of a toggle switch construction that alternately switches between the ON and OFF states, the switch mechanism may be of an "automatic-reset" construction as explained below. Namely, when the resolution is set to the fine resolution #1 by the knob-type operator 10 being depressed in the axial direction (i.e., placed in the push-ON state) and once the operator 10 is rotated in such a depressed position, control is performed to change the corresponding parameter setting in the signal processing circuit 4 in accordance with the fine resolution #1. Then, as the depressing force by the human operator is removed, the knob-type operator 10 is automatically returned to the initial undepressed position (corresponding to the OFF state), so that resolution is set to the coarse resolution #2. Once the knob-type operator 10 is rotated in the undepressed position, control is performed to change the corresponding parameter setting in the signal processing circuit 4 in accordance with the coarse resolution #2. In the case where the automatic-reset construction is employed, a means, such as a spring, for automatically returning the operator to the undepressed position may be provided on the operator 10, and the human operator only has to depress the knob-type operator 10 only when the corresponding parameter is to be set in accordance with the fine resolution #1; thus, an even further enhanced operability can be achieved.

Further, in the above-described embodiment, the push-type ON/OFF switch mechanism provided on or in the knob-type operator 10 is constructed so that the ON/OFF states (i.e., coarse and fine resolution) alternate in response to depressing operation. Alternatively, the switch mechanism may be constructed as a latch-type mechanism such that the operator 10 is latched in the depressed position while the switch mechanism is in the ON state and then returned to the OFF position in response to further depressing operation. Further, whereas the preferred embodiment has been described above in relation to the case where the push-type ON/OFF switch mechanism is provided on or in the knob-type operator 10, the present invention is not so limited. For example, the knob-type operator 10 may be provided with a switch means for selecting any one of at least two states so that the resolution for converting the operated amount of the operator into a variation amount of the corresponding parameter setting is set to any one of at least two different types of resolution in response to which one of the at least two states has been selected.

Furthermore, a dedicated LED for indicating a current setting of the resolution (e.g., which one of the coarse resolution and fine resolution is currently set) may be provided near the knob-type operator 10 to allow the human operator to visually identify the current setting of the resolution; this scheme is particularly useful in the case where switching is made between the two different types of resolution through the ON/OFF operation of the toggle switch as set forth above.

Furthermore, whereas the preferred embodiment has been described in relation to the case where the LEDs 12 are provided around the knob-type operator 10, the provision of the LEDs 12 is not necessarily essential. Furthermore, whereas the coarse resolution #2 has been described as set in correspondence with the LEDs 12, the rotating angle of the knob-type operator 10 and the parameter setting may be associated with each other in the case where there is provided no such LED 12.

Furthermore, separate resolution may be defined for each type of parameter to be controlled, or same or common resolution may be defined for a predetermined plurality of types of parameters.

Although the preferred embodiment has been described above in relation to knob-type operators provided on a digital mixer, the basic principles of the present invention may be applied to any other sound control apparatus than digital mixers, such as electronic musical instruments, as long as the sound control apparatus include parameter-setting knob-type operators.

What is claimed is:

1. A device for detecting operation of an operator on a sound control apparatus, said device comprising:
    an operator operable in two operational directions to change a value of a parameter to be used in said sound control apparatus;
    a detection section for detecting an operated amount corresponding to operation of said operator in a first one of the two operational directions;
    a resolution setting section that, on the basis of operation of said operator in a second one of the two operational directions, sets resolution of the operated amount, in the first operational direction, of said operator to any one of at least two types of resolution;
    a conversion section that converts the operated amount, detected by said detection section, into operator output information based on the resolution set by said resolution setting section; and
    a change section that changes the value of the parameter to be used in the sound control apparatus in accordance with the operator output information.

2. A device as claimed in claim 1 wherein said operator is operable in a rotating operation direction about a rotation axis thereof and in a depressing operation direction along the rotation axis, and
    wherein said detection section detects an operated amount corresponding to the rotating operation of said operator, and said resolution setting section sets the resolution to any one of at least two types of resolution depending on whether said operator has been operated in the depressing operation direction.

3. A device as claimed in claim 1 wherein a display device that displays an operating state of said operator based on the operator output information outputted by said conversion section is provided in corresponding relation to said operator.

4. A device as claimed in claim 1 wherein the two operational directions in which said operator is operable are directions of different dimensions.

5. A device as claimed in claim 1 wherein, when the resolution set by said resolution setting section is predetermined first resolution, said conversion section handles the operated amount, detected by said detection section, as an absolute value based on said first resolution, but when the resolution set by said resolution setting section is predetermined second resolution, said conversion section handles the operated amount, detected by said detection section, as an increment value based on said second resolution, and
    wherein said conversion section generates and outputs the operator output information in accordance with the absolute value or increment value.

6. A device as claimed in claim 1 which includes a plurality of the operators of different types that are operable to set different types of parameters, and wherein the resolution set by said resolution setting section differ in degree depending on the type of said operator.

7. A device as claimed in claim 1 wherein said sound control apparatus is a mixer apparatus.

8. A method for detecting operation of an operator on a sound control apparatus, said operator being operable in two operational directions, said method comprising:
    a step of detecting an operated amount corresponding to operation of said operator in a first one of the two operational directions;
    a resolution setting step of on the basis of operation of said operator in a secopd one of the two operational directions, setting resolution of the operated amount, in the first operational direction, of said operator to any one of at least two types of resolution;
    a step of converting the operated amount, detected by said step of detecting, into operator output information based on the resolution set by said resolution setting step
    a step of changing the value of the parameter to be used in the sound control apparatus in accordance with the operator output information.

9. A computer-readable storage medium containing a program for causing a computer to perform a procedure for detecting operation of an operator on a sound control apparatus, said operator being operable in two operational directions to change a value of a parameter to be used in the sound control apparatus, said procedure comprising:
    a step of detecting an operated amount corresponding to operation of said operator in a first one of the two operational directions;
    a resolution setting step of on the basis of operation of said operator in a second one of the two operational directions, setting resolution of the operated amount, in the first operational direction, of said operator to any one of at least two types of resolution;

a step of converting the operated amount, detected by said step of detecting, into operator output information based on the resolution set by said resolution setting step;

a step of changing the value of the parameter to be used in the sound control apparatus in accordance with the operator output information.

10. A device for detecting operation of an operator on a sound control apparatus, said device comprising:

an operator operable both in a rotational direction and a rotation axis direction to change a value of a parameter to be used in said sound control apparatus;

a detection section for detecting an operated amount corresponding to operation of said. operator in the rotational direction;

a resolution setting section that sets resolution of the operated amount of said operator to a first type of resolution in a state where said operator is depressed in the rotation axis direction, and that sets resolution of the operated amount of said operator to a second type of resolution in a state where said operator is not depressed in the rotation axis direction;

a conversion section that converts the operated amount, detected by said detection section, into operator output information based on the resolution set by said resolution setting section; and a change section that changes the value of the parameter to be used in the sound control apparatus in accordance with the operator output information.

11. A device as claimed in claim 10 wherein said operator is automatically returned to an initial position when the depression is released.

12. A device for detecting operation of an operator on a sound control apparatus, said device comprising:

an operator operable both in a rotational direction and a rotation axis direction to change a value of a parameter to be used in said sound control apparatus;

a detection section for detecting an operated amount corresponding to operation of said operator in the rotational direction;

a resolution setting section that sets resolution of the operated amount of said operator to a first type of resolution in a first state where said operator is depressed in the rotation axis direction, and that sets resolution of the operated amount of said operator to a second type of resolution in a second state where said operator is not depressed in the rotation axis direction; and a change section that, when said operator is operated in the rotational direction in the first state where said operator is depressed in the rotation axis direction, changes the value of the parameter by a first amount according to the operated amount and the first type of resolution, and that, when said operator is operated in the rotational direction in the second state where said operator is not depressed in the rotation axis direction, changes the value of the parameter by a second amount according to the operated amount and the second type of resolution.

13. A device as claimed in claim 12 wherein said operator is automatically returned to an initial position when the depression is released.

* * * * *